(12) United States Patent
Paffen et al.

(10) Patent No.: US 11,842,640 B2
(45) Date of Patent: Dec. 12, 2023

(54) COMPUTING SYSTEM AND METHOD FOR OPERATING A COMPUTING SYSTEM

(71) Applicant: Audi AG, Ingolstadt (DE)

(72) Inventors: Matthijs Paffen, Karlskron (DE); Hans-Georg Gruber, Ingolstadt (DE); Jürgen Lerzer, Neumarkt (DE)

(73) Assignee: AUDI AG, Ingolstadt (DE)

( * ) Notice: Subject to any disclaimer, the term of this patent is extended or adjusted under 35 U.S.C. 154(b) by 752 days.

(21) Appl. No.: 16/606,985

(22) PCT Filed: Mar. 20, 2018

(86) PCT No.: PCT/EP2018/056920
§ 371 (c)(1),
(2) Date: Oct. 21, 2019

(87) PCT Pub. No.: WO2018/197110
PCT Pub. Date: Nov. 1, 2018

(65) Prior Publication Data
US 2020/0349837 A1 Nov. 5, 2020

(30) Foreign Application Priority Data

Apr. 25, 2017 (DE) ...................... 10 2017 206 887.6

(51) Int. Cl.
*G08G 1/0968* (2006.01)
*G06F 9/50* (2006.01)
(Continued)

(52) U.S. Cl.
CPC ..... *G08G 1/096827* (2013.01); *G06F 9/5072* (2013.01); *G06F 9/5077* (2013.01); *G07C 5/008* (2013.01); *H04L 67/12* (2013.01)

(58) Field of Classification Search
None
See application file for complete search history.

(56) References Cited

U.S. PATENT DOCUMENTS 6,304,816 B1 * 10/2001 Berstis ................ G08G 1/0104
701/2
2004/0107045 A1 6/2004 Kynast et al.
(Continued)

FOREIGN PATENT DOCUMENTS

CN 102819961 A 12/2012
DE 101 05 898 A1 8/2002
(Continued)

OTHER PUBLICATIONS

International Search Report and Written Opinion of the International Searching Authority directed to related International Patent Application No. PCT/EP2018/056920, dated Jun. 29, 2018, with attached English-language translation; 15 pages.
(Continued)

*Primary Examiner* — Maceeh Anwari
(74) *Attorney, Agent, or Firm* — Sterne, Kessler, Goldstein & Fox P.L.L.C.

(57) ABSTRACT

The present disclosure relates to a computing system comprising at least one computing device of at least one motor vehicle, and a cloud comprising at least one computing device, at least one application calculating output data from input data being implemented in a divided manner at least partially by the motor vehicle computing device and at least partially on the cloud side.

14 Claims, 1 Drawing Sheet

(51) Int. Cl.
*G07C 5/00* (2006.01)
*H04L 67/12* (2022.01)

(56) References Cited

U.S. PATENT DOCUMENTS

| | | | |
|---|---|---|---|
| 2013/0268935 A1* | 10/2013 | Paul | G06F 9/44505 |
| | | | 718/100 |
| 2013/0304863 A1 | 11/2013 | Reber | |
| 2015/0088352 A1 | 3/2015 | Günter | |
| 2016/0091328 A1 | 3/2016 | Ould-Ahmen-Vall et al. | |
| 2018/0238698 A1* | 8/2018 | Pedersen | B60L 58/16 |

FOREIGN PATENT DOCUMENTS

| | | | |
|---|---|---|---|
| DE | 10 2011 083 677 A1 | | 4/2013 |
| DE | 10 2012 008 978 A1 | | 11/2013 |
| DE | 20 2012 008 978 A1 | | 11/2013 |
| DE | 10 2012 107 886 A1 | | 2/2014 |
| DE | 102012107886 A1 | * | 2/2014 |
| DE | 10 2013 007 676 A1 | | 11/2014 |
| DE | 10 2015 005 703 A1 | | 11/2016 |

OTHER PUBLICATIONS

Written Opinion Of The International Preliminary Examining Authority directed to related International Patent Application No. PCT/EP2018/056920, dated Apr. 3, 2019, with attached English-language translation; 13 pages.

International Preliminary Report on Patentability directed to related International Patent Application No. PCT/EP2018/056920, completed Aug. 2, 2019, with attached English-language translation; 13 pages.

Office Action filed in application No. CN 201880027270.8, with attached English language Google machine translation, dated Oct. 9, 2022; 26 pages.

* cited by examiner

COMPUTING SYSTEM AND METHOD FOR OPERATING A COMPUTING SYSTEM

TECHNICAL FIELD

The present disclosure relates to a computing system comprising at least one computing device of at least one motor vehicle, and a cloud comprising at least one computing device. In addition, the present disclosure relates to a method for operating such a computing system.

BACKGROUND

In modern motor vehicles, an increasing number of functions are realized which, in some cases, require demanding implementation, for example, for advanced driver assistance systems (ADAS) and/or infotainment systems (IVI—in-vehicle infotainment). For such as well as further modern functions realized in motor vehicles, a high computing power and/or a high amount of available input data are needed to solve the complex and/or lengthy computing tasks. Corresponding solution approaches mostly use motor vehicle-external server devices, to which a wireless communication link is established. From these server devices, information can be retrieved, for example, required current input data, but it is also conceivable to have at least those portions of the computing power, which are required to perform a function realized by an application, realized by the server device. In such case, the server device can also be a cloud or form part of a cloud.

An example of computing-intensive functions within a motor vehicle is the computing of routes, particularly for determining travel times, to points of interest (POI) in the context of a navigation system. For this purpose, users, i.e., drivers of the motor vehicle, often wish to see immediately, how long the travel time to a respective POI will be. However, the computation requires route planning using a plurality of input data which, in addition to the digital map data, for example, also comprise current traffic information, and the like. Especially when the motor vehicle is supposed to be driven in an automatically guided manner to a POI, aspects of trajectory planning can also be included. If input data and/or applications or subprocesses of applications on a server device are used for this purpose, the corresponding function in the motor vehicle is only available if the communication link to the server device also exists because otherwise it would only be possible to use the information available on board the motor vehicle.

DE 101 05 898 A1 relates to a method for transferring destination guidance elements from a vehicle navigation device to a control center. The vehicle navigation device is not supposed to have resources sufficient for computing the route, which is why there is communication via a communication device to a control center, in which the routes are calculated.

DE 10 2012 107 886 A1 relates to a method for the electronic detection of traffic signs, in which data of the recognized basic pattern are transferred wirelessly to an external server unit by means of a communication device of the vehicle, and a pattern recognition is carried out by the external server unit by means of a pattern recognition algorithm. As a result of the pattern recognition, the data of the recognized traffic sign are transferred to the communication unit of the vehicle and a corresponding traffic sign is shown in particular on a display unit.

In addition to the problem of no longer available functions in a partial externalization from the motor vehicle, there is also the problem that, in case of a separate implementation of the application or the subprocesses within the motor vehicle or in the server device, the flexibility is restricted because corresponding software means and/or hardware means specific to the motor vehicle and/or the server must be developed.

BRIEF DESCRIPTION OF DRAWINGS/FIGURES

DETAILED DESCRIPTION

Figure 1:
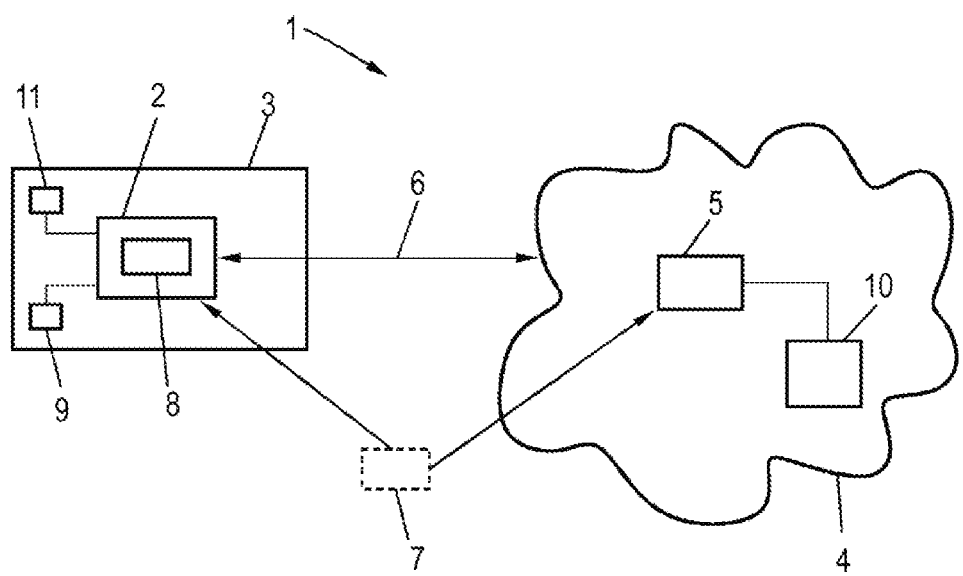
FIG. 1 illustrates a computing system, in accordance with some embodiments.

The present disclosure therefore addresses the problem of proposing a computing system that provides more flexibility and improves particularly the availability of functions within the motor vehicle.

This problem is solved in that, in a computing system of the initially described type, it is provided according to the present disclosure that at least one application calculating output data from input data can be executed in a divided manner at least partially by the motor vehicle computing device and at least partially on the cloud side.

In some embodiments, a control unit of the computing system is used, which is preferably provided at least partially on the motor vehicle side in order to dynamically decide to what extent the application should take place in the motor vehicle itself or on the part of the cloud communicating with the motor vehicle. In this case, it is particularly preferred if both the motor vehicle computing device and the cloud, or the at least one computing device of the cloud, can also execute the application entirely if circumstances so require, which shall be discussed in more detail below.

In some embodiments, a divided computation of applications between a motor vehicle and a cloud infrastructure is provided, wherein preferably both the motor vehicle computing device and the at least one cloud computing device are also designed to entirely execute the application. The computing system thus represents a divided system, in which computational components provided in the communicating computing devices communicate with one another and coordinate their computational activities by exchanging messages. The computational components interact with one another in order to pursue a specific objective, in this case, to determine the output data of the application. The application is thus implemented as a so-called divided computer program, wherein the application is subdividable particularly into different subprocesses, which can be allocated to different computing devices, particularly depending on at least one allocation criterion which is verified in the control unit. The control unit can be implemented via a software platform that provides the flexibility to optionally perform the application or a portion of the application either in the motor vehicle computing device or within the cloud. This, in turn, makes it possible to shift the computational load between the motor vehicle computing device and the cloud, thus providing the basis for flexible, particularly motor vehicle functions, for example, driver assistance functions and/or infotainment functions, which were not developed specifically for the motor vehicle computing device or the cloud. In this context, the control unit can comprise software platform means, which ensures the compatibility and context availability of the application components.

Thus, an architecture is created, by which particularly functions to be used in the motor vehicle, depicted by an application, can be divided dynamically and flexibly between the motor vehicle and a cloud communicating with the motor vehicle. Advantageously, applications comprising their context or their subprocesses can therefore be divided so expediently that the greatest benefit can be achieved on both sides from the available computing power and the available input data. The herein described access according to the present disclosure can thus be used advantageously to move or externalize a computing load from the motor vehicle to the cloud and/or from the cloud to motor vehicles, which offers the flexibility of executing at least one application either in the cloud or in the motor vehicle, or to select a divided execution.

In some embodiments, with regard to a workability to be enabled completely on the part of the vehicle and in the cloud, the possibility of providing sufficient input data in both locations in the same manner, i.e., particularly with the use of the same interface, is presented. For example, an advantageous development of the present disclosure provides that the motor vehicle and the cloud are each provided with at least one database which is addressable by the application, delivers input data, and is structured similarly for both the motor vehicle and the cloud. The databases therefore have particularly identical interfaces and/or identical data formats/data structures. However, the contents of the databases can definitely differ from one another. In many cases, the cloud database will contain a greater quantity of information than the motor vehicle database and/or the cloud database will contain more current information than the motor vehicle database. Due to the identical structure and/or compatibility of the databases, the divided computing approach allows for the flexibility of also executing motor vehicle applications with a larger dataset or a more recent dataset in the cloud. In addition to the presence of a larger and/or more current input dataset, it naturally also applies that computing load can be shifted from the motor vehicle computing device to the cloud.

In some embodiments, the computing system expediently has a control unit for dividing subprocesses of the application between the computing devices, wherein the motor vehicle computing device has at least one subcomponent of the control unit and/or at least one client unit communicating with the control unit. The control unit can preferably apply a motor vehicle-centered approach, which is mainly concerned with realizing functions to be used during the operation of the motor vehicle and/or supporting its user by means of the applications, which can also be realized, at least with regard to the computing load distribution of a computing task present in the motor vehicle, within the motor vehicle, which makes it possible, for example, in case of a missing communication link, to still execute the application, but entirely within the motor vehicle.

In some embodiments, the subprocesses are ideally allocated using at least one allocation criterion. For that purpose, it can be specifically provided that the subprocesses are divided between the cloud and the motor vehicle on the basis of a utilization of the respective computing devices and/or an availability of input data and/or an availability and/or quality of a communication link. Depending on the utilization on the part of the respective computing devices, particularly a dynamic distribution is thus possible, and so, if a large free computing power is currently available in the motor vehicle computing device, a greater portion can be executed in the motor vehicle computing device than would be the case in a heavily utilized motor vehicle. Conversely, it is naturally also conceivable, in case of a sparsely utilized motor vehicle, e.g., a parked motor vehicle, to at least partially externalize to the motor vehicle an application initiated by the server. The data quality of the input data can be a further allocation criterion, and so, if more current and/or more accurate input data are present in the cloud, the cloud can be used as the execution location for the corresponding subprocess that requires said input data. Finally, the availability and/or quality of the communication link between the cloud and the motor vehicle can also be relevant, and so, for example, in case of a low-quality communication link, subprocesses, for which a large quantity of data would have to be transmitted, are preferably executed by the initiator of the corresponding instance of the application. However, this can basically also apply to large quantities of data which are only generated by the motor vehicle or by the cloud, and so it can be provided, for example, that, in the case of a subprocess evaluating sensor data of the motor vehicle, i.e., sensor data recorded by sensors of the motor vehicle, said subprocess is preferably allocated to the motor vehicle computing device. Sensor data not yet evaluated can usually represent a large quantity of data, which can be initially reduced by evaluation in a subprocess in order to reduce the utilization of the communication link, especially if its quality is rather poor.

In some embodiments, with regard to the communication link between the motor vehicle and the cloud, it can be provided that the communication link comprises a mobile phone network and/or a local wireless network and/or a communication line of a charging cable in a motor vehicle connected for charging purposes. In most cases, the communication link will thus be wireless, wherein, in exceptional cases, wired communication links can also be present and used, for example, when a charging cable, used to charge a battery installed in the motor vehicle, is also designed for a data exchange with a high bandwidth, thus making a particularly good communication link to the cloud possible. With regard to the wireless communication links, the information between the cloud and the motor vehicle, particularly the messages in case of the divided computation, can be exchanged via a mobile phone network and/or a local wireless network, e.g., a WLAN network.

In some embodiments, in addition to messages relating to the divided computation, software means realizing at least subprocesses of the applications can also be exchangeable between the motor vehicle and the cloud. In this manner, it is also possible to make updates and/or to not necessarily have software means for realizing the application available in both locations, but instead provide said software means only, for example, when they are needed for a divided computation. In this manner, memory space requirements can be further reduced, if necessary.

In some embodiments, at least one application realizes a motor vehicle function, particularly a navigation function, to be used during operation of the motor vehicle and/or to assist a driver of the motor vehicle. Especially for the initially discussed, complex modern functions that are provided in motor vehicles, and which comprise particularly ADAS functions and/or IVI functions, the option to compute corresponding applications in flexible, divided manner provides a multitude of advantages, particularly with regard to the implementation of more elaborate functions and also their improved availability, especially since a computation exclusively in the motor vehicle is still possible. Motor vehicles can thus be significantly improved in this manner both in terms of comfort and in terms of operation. In the example of navigation functions, this becomes apparent because, for example, partial computations can be externalized to the cloud, where particularly more accurate and/or more current input data are available and/or greater computing power is available for faster computation. Nevertheless, in the case of unavailability of the communication link to the cloud and/or a poor quality of the communication link to the cloud, it is not necessary to forego the function in the motor vehicle because it is then possible to draw on a computation within the motor vehicle and the function is basically still available.

In some embodiments, in addition to computing tasks (applications) initiated within the motor vehicle itself, computing tasks can naturally also be externalized dynamically in the opposite direction from the cloud in the direction of the at least one motor vehicle, which is advantageous particularly when a plurality of motor vehicles is part of the computing system. It can thus be provided particularly advantageously that at least one of the at least one application comprises a development application which, particularly for a multiplicity of motor vehicles, evaluates operating data of the motor vehicle as input data, particularly comprising sensor data and/or status data of the motor vehicle. A cloud application can therefore also be at least partially externalized to at least one motor vehicle in order to perform local computations, particularly based on local input data, such as sensor data. The cloud application can be executed particularly on a multiplicity of computing devices of different motor vehicles in order to utilize the available computing power of motor vehicles, where it is currently not needed, and to also use a multiplicity of different input data, for example, when a statistical evaluation of sensor data and/or other operating data of the motor vehicle is concerned, especially with regard to the development of new functions for motor vehicles, new vehicle systems and/or means usable in road traffic.

It should be noted that, within the scope of the present disclosure, it is also entirely conceivable that the workability of at least one additional application is additionally limited to the motor vehicle computing device and/or the cloud. Therefore, the access to the divided computation described herein does not limit the possibility of providing separate applications on the part of the motor vehicle and/or the cloud, for example, to select the conventional client-server access for certain functions, for example, if an additional application cannot be fully executed due to a lack of computing power within a motor vehicle, and the like.

In some embodiments, in addition to the computing system, the present disclosure also relates to a method for operating a computing system, particularly a computing system according to the present disclosure, comprising at least one computing device of at least one motor vehicle, and a cloud comprising at least one computing device, wherein, in case of an application to be executed, said application calculating output data from input data, a control device of the computing system executes subprocesses of the application in a divided manner at least partially in the motor vehicle computing device and at least partially on the cloud side. The control unit thus decides, particularly on the basis of at least one allocation criterion and taking into account the current situation, how subprocesses of the application are supposed to be divided. All descriptions relating to the computing system can be analogously applied to the method according to the present disclosure, with which the already mentioned advantages can thus also be obtained.

Further advantages and details of the present disclosure will become apparent from the following embodiments and with reference to the drawings.

FIG. 1 illustrates a computing system, in accordance with some embodiments. FIG. 1 shows a computing system 1, which comprises at least one computing device 2, particularly computing devices 2 of different motor vehicles 3, and a cloud 4, which in turn comprises at least one, usually a plurality of computing devices 5. The motor vehicle 3, or the computing device 2, respectively, and the cloud 4 can communicate via a communication link 6, wherein the communication link 6 can also be designed differently over time, but in most cases, it will comprise at least one wireless section using a mobile phone network and/or a local wireless network. If applicable, the communication link 6 can also be established via a charging cable for charging a battery of the motor vehicle 3, particularly in a broadband and wired manner. The computing system 1 further comprises a control unit 7, only indicated herein, which can be realized in a divided manner, and can therefore have control components both in the computing device 2 and in the computing device 5.

By means of the control unit 7, the computing system 1 is designed to execute applications, which are supposed to calculate output data from input data, in a divided manner within the computing system 1, particularly at least partially in the motor vehicle computing device 2 and within the cloud 4. For this purpose, two advantageous particularities are present. The application can also be completely executed in both the motor vehicle 3 and the cloud 4; in other words, programming means for the application are present both in the motor vehicle 3 and in the cloud 4, or are at least applicable in both locations if the programming means are also exchangeable via the communication link 6. For this purpose, the control unit 7 can comprise, for example, software platform means 8 as part of the motor vehicle computing device 2, which ensure the compatibility or workability of such software means; corresponding software platform means can naturally also be provided in the cloud 4. The application was therefore developed not only for the cloud 4 or solely for the motor vehicle 3, but in such a way that an execution of its software means is made possible in both locations.

In order to facilitate the complete workability both in the motor vehicle 3 and in the cloud 4, i.e., to particularly allow execution of the application by the motor vehicle 3 even if the communication link 6 does not exist temporarily and/or is of poor quality, databases 9, 10 are provided both in the motor vehicle 3 and in the cloud 4, which are structured identically, i.e., in the present case, they particularly have an identical access interface, identical data formats, and identical data structures. It is quite possible that larger quantities of data and/or more accurate and/or more current input data for the application are present in the database 10 of the cloud 4 than in the database 9, wherein, at an existing communication link 6, a particularly regular synchronization can advantageously be performed at least with regard to updates.

Allocation criteria, which thus determine where specific subprocesses of an application to be executed are supposed to be realized, evaluate the current utilization of the motor vehicle computing device 2 and the cloud 4 in the present case similarly to the availability of input data and/or the quality/presence of the communication link 6. Consequently, at least those components of the control unit 7, which are supposed to allocate applications or their subprocesses initiated on the motor vehicle side, are present in the motor vehicle 3 in an independently functional manner. This allows particularly for the above-described execution of applications initiated on the motor vehicle side solely in the motor vehicle. One allocation criterion can make it also possible that, in the case of input data originating from a data source in the motor vehicle, e.g., sensor data from sensors 11 of the motor vehicle 3, corresponding subprocesses are subsequently also performed in the motor vehicle 3 in order to achieve at least a data reduction through the corresponding evaluation of the sensor data, and so not too many data have to be transmitted via the communication link 6.

Figure 2:
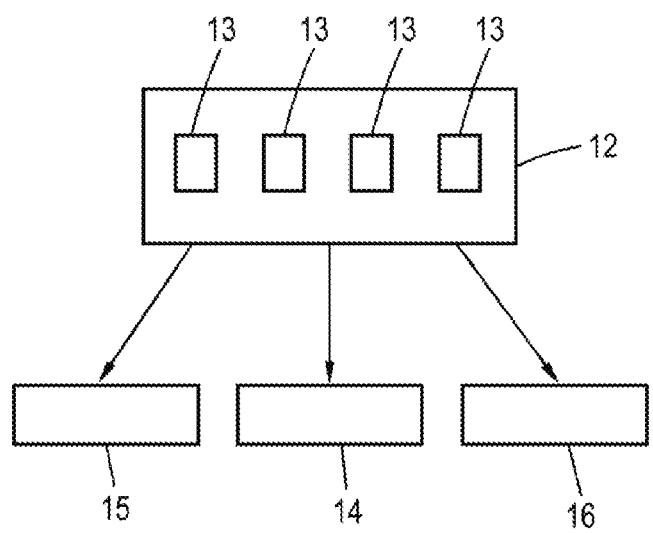
FIG. 2 illustrates an outline of the method, in accordance with some embodiments.

FIG. 2 illustrates an outline of the method, in accordance with some embodiments. FIG. 2 again shows the possibilities provided by the flexible distribution in the form of a corresponding illustration. In this case, an application 12, which can be divided into a plurality of subprocesses 13, is supposed to be executed, and which can thus be basically executed in a divided manner. The most frequently used option for the divided computation is a distribution between the cloud 4 and the motor vehicle computing device 2, which means that portions of the application 12, thus at least one subprocess 13, are realized in the motor vehicle computing device 2, while the rest of the subprocesses 13 are realized in the cloud 4 using the computing devices 5 therein. This is symbolized by the box 14. The boxes 15 and 16 still symbolize further possible extreme cases possibly resulting from the evaluation of the allocation criteria, namely, in the case of the box 15, the complete execution by the motor vehicle 3, in the case of the box 16, the complete execution by the cloud 4.

As already described, the application 12 can be an application initiated on the motor vehicle side, which can then relate to the operation of the motor vehicle 3 and/or the assistance of a user of the motor vehicle 3. For example, the application can realize a function of an ADAS and/or an IVI system. For this purpose, an example with respect to a navigation system, namely the route calculation, shall be described briefly in more detail. Assuming that a navigation map is displayed within the motor vehicle, in which various points of interest (POI) are displayed. The navigation system is now supposed to offer the function of being able to inform the user directly about the extent of the spatial and temporal distance to the various POI. The corresponding route travel time can then be computed as an application 12 in a divided manner in the motor vehicle 3 and in the cloud 4, wherein the allocation criteria are correspondingly evaluated with regard to the current operating state of the computing system 1. The more accurate, more current and/or more extensive database 10, for example, suggests a computation of subprocesses 13 by the cloud 4, for example, if the corresponding data are required as input data for the subprocess 13; the greater computing power available in the cloud 4 also suggests said computation. However, it is indicated to also execute the subprocesses 13 within the motor vehicle 3 if computing resources of the computing device 2 are already available, and if the computations of some subprocesses 13 are even based on input data originating in the motor vehicle 3, e.g., with regard to fuel consumption and/or an environmental model, and/or if the quality of the communication link 6 is rather poor. Since the motor vehicle 3 also has a database 9, all subprocesses 13 can even be executed in an extreme case within the motor vehicle 3, and so the corresponding function of the navigation system is always available. Output data generated by the cloud 4 are correspondingly transmitted back to the motor vehicle 3. The output data (route, lateral and spatial distance) for each POI are thus obtained and can be displayed within the motor vehicle 3.

Applications 12 which are initiated on the cloud side, for example, development applications, can also be calculated in a divided manner which, for example, is indicated whenever motor vehicles 3 of the computing system 1 can provide a greater amount of free computing power, e.g., in the parked state, and ideally when the motor vehicle 3 is connected for charging purposes because this also ensures sufficient electric energy. Another area of application, especially for development applications, is provided when operating data are already supposed to be evaluated in motor vehicles 3, for example, sensor data and the like, particularly with regard to the development of new vehicle systems/functions and the like. As a result, corresponding subprocesses can begin the evaluation of the operating data of the motor vehicle 3 immediately on-site in the motor vehicle computing device 2 and the results of even a larger number of vehicles 3 can be combined in the cloud 4.

The invention claimed is:

1. A computing system, comprising:
    a computing device of a motor vehicle, the computing device and/or the motor vehicle configured to communicate with a computing device in a cloud system using a communication link; and
    a control unit implemented via a software platform, the control unit configured to perform operations comprising:
        dynamically distributing a plurality of subprocesses of an application to a plurality of computing devices comprising the computing device of the motor vehicle and the computing device in the cloud system, wherein the distributing the plurality of subprocesses between the computing device of the motor vehicle and the computing device in the cloud system is based on a quality of the communication link,
        in response to the communication link being missing or low-quality, executing, by the computing device of the motor vehicle, applications corresponding to functions to be used during vehicle operation or functions for supporting a vehicle user;
        causing to execute the application on both the computing device of the motor vehicle and the computing device in the cloud system, wherein the application comprises a divided computation;
        exchanging, with the cloud system, a message related to coordination of computational activities associated with the divided computation;
        exchanging, with the cloud system, at least one software component corresponding to the plurality of subprocesses of the application;
        determining, from the divided computation, the output data of the application based on an input data; and
        causing to receive, by the motor vehicle, the output data determined from the divided computation; and
        causing to display the output data within the motor vehicle, wherein the output data comprises route, lateral distance, spatial distance, or points of interest related to the motor vehicle.

2. The computing system of claim 1, further comprising:
    a database at the motor vehicle configured to store the input data, wherein the database at the motor vehicle is addressable by the application,
    wherein a data storage capacity of the database at the motor vehicle is small in comparison with a data storage capacity of a database at the cloud system, and
    wherein the database at the cloud system is addressable by the application.

3. The computing system of claim 2, wherein the database of the motor vehicle and the database of the cloud have identical data formats, identical data structures and identical access interface.

4. The computing system of claim 1, wherein the computing device of the motor vehicle comprises a subcomponent of the control unit, and a client unit communicating with the control unit.

5. The computing system of claim 1, wherein a subprocess of the plurality of subprocesses is configured to evaluate sensor data of the motor vehicle, wherein the subprocess is allocated to the computing device of the motor vehicle.

6. The computing system of claim 1, wherein the application corresponds to a motor vehicle function, and wherein the motor vehicle function comprises a navigation function to be used during operation of the motor vehicle or to assist a driver of the motor vehicle.

7. The computing system of claim 1, wherein the application comprises a development application configured to evaluate the input data,
- wherein the input data comprise operating data of the motor vehicle, and
- wherein the operating data of the motor vehicle comprises sensor data or status data of the motor vehicle.

8. The computing system of claim 1, wherein the plurality of subprocesses are divided between the cloud system and the motor vehicle based on at least one of:
- a utilization of the computing device of the motor vehicle and the computing device in the cloud system;
- an availability of the input data;
- an availability of the communication link; and
- a quality of the communication link.

9. The computing system of claim 8, wherein the communication link comprises at least one of a mobile phone network, a local wireless network, and a communication line of a charging cable in the motor vehicle.

10. The computing system of claim 1, wherein the control unit is configured to allocate processing of a subprocess of a plurality of subprocesses to the computing system for the subprocess that requires input data originating from a data source within the motor vehicle.

11. A method for operating a computing system, the method comprising:
- dynamically distributing a plurality of subprocesses of an application to a plurality of computing devices comprising a computing device of a motor vehicle and a computing device in a cloud system, wherein the computing device of the motor vehicle and the computing device in the cloud system communicate using a communication link distributing the plurality of sub-processes between the computing device of the motor vehicle and the computing device in the cloud system is based on a quality of the communication link;
- in response to the communication link being missing or low-quality, executing, by the computing device of the motor vehicle, applications corresponding to functions to be used during vehicle operation or functions for supporting a vehicle user;
- executing the application on both the computing device of the motor vehicle and the computing device in the cloud system, wherein the application comprises a divided computation;
- exchanging, between the motor vehicle and the cloud system, a message related to coordination of computational activities associated with the divided computation;
- exchanging, between the motor vehicle and the cloud system, a software component corresponding to the plurality of subprocesses of the application;
- determining, from the divided computation, the output data of the application based on the input data; and
- receiving, by the motor vehicle, the output data determined from the divided computation; and
- displaying the output data within the motor vehicle, wherein the output data comprises route, lateral distance, spatial distance, or points of interest related to the motor vehicle.

12. The method of claim 11, wherein the application corresponds to a motor vehicle function, wherein the motor vehicle function comprises a navigation function to be used during operation of the motor vehicle or to assist a driver of the motor vehicle.

13. The method of claim 11, wherein the application comprises a development application configured to evaluate the input data,
- wherein the input data comprise operating data of the motor vehicle, and
- wherein the operating data of the motor vehicle comprise sensor data or status data of the motor vehicle.

14. The method of claim 11, further comprising allocating processing of a subprocess of a plurality of subprocesses to the computing system for the subprocess that requires input data originating from a data source within the motor vehicle.

* * * * *